United States Patent [19]
Millard et al.

[11] Patent Number: 5,303,387
[45] Date of Patent: Apr. 12, 1994

[54] ARRANGEMENT FOR UTILIZING A PASSIVE LINE CONCENTRATOR IN A MANAGED TOKEN RING NETWORK

[75] Inventors: Steven J. Millard, New Cumberland; Bret A. Matz, Harrisburg, both of Pa.; Hemant K. R. Kumar, Bangalore; Kalampukattussery C. Babu, Kerala, both of India

[73] Assignee: The Whitaker Corporation, Wilmington, Del.

[21] Appl. No.: 881,012

[22] Filed: May 8, 1992

[51] Int. Cl.⁵ .......................................... H04L 12/42
[52] U.S. Cl. ............................. 395/200; 340/825.05; 370/85.5
[58] Field of Search ...................... 395/200, 500, 750; 340/825.05; 370/85.5

[56] References Cited

U.S. PATENT DOCUMENTS

| | | | |
|---|---|---|---|
| Re. 31,852 | 3/1985 | Soderblom | 370/90 |
| 4,862,158 | 8/1989 | Keller et al. | 340/825.05 |
| 4,882,728 | 11/1989 | Herman | 370/85 |
| 4,935,926 | 6/1990 | Herman | 370/85.13 |
| 4,937,823 | 6/1990 | Bekki et al. | 371/11.2 |
| 5,101,405 | 3/1992 | Bekki et al. | 370/85.15 |
| 5,132,832 | 7/1992 | Matz et al. | 359/137 |
| 5,181,858 | 1/1993 | Matz et al. | 439/188 |
| 5,199,026 | 3/1993 | Lund | 370/56 |

Primary Examiner—Dale M. Shaw
Assistant Examiner—Fran Faller

[57] ABSTRACT

An arrangement whereby a passive line concentrator (100) can be connected in a managed token ring network includes a special concentrator port (200) in an active concentrator (10) which is adapted to have inserted the ring-in port (130) of the passive line concentrator. The special concentrator port of the active concentrator supplies a small phantom current to the passive concentrator, which returns the phantom current only if it has at least one active port. Detection of the returned phantom current controls insertion of the special concentrator port into the network.

6 Claims, 4 Drawing Sheets

ARRANGEMENT FOR UTILIZING A PASSIVE LINE CONCENTRATOR IN A MANAGED TOKEN RING NETWORK

BACKGROUND OF THE INVENTION

This invention relates to ring communications networks and, more particularly, to an arrangement whereby a passive line concentrator can be connected in a managed token ring network.

A token ring network is a well defined and standardized type of network arranged so that computers connected to the network may communicate with each other. Such a network includes a trunk which forms part of a normally closed ring and further includes at least one token ring concentrator having a number of input/output ports through which, by means of relay switching, computers may be inserted into the network. A standard governing token ring networks is the IEEE Standard 802.5, wherein each of the input/output ports is referred to as a trunk coupling unit. According to this standard, insertion of a computer into the ring is controlled by the computer itself, with the mechanism for effecting the insertion or bypass of the computer residing in the respective input/output port of the concentrator. Each computer is connected to a respective input/output port of the concentrator via a medium interface cable (MIC) and the computer exercises control of the insertion/bypass mechanism via the MIC using a phantom circuit technique. The phantom circuit impresses a DC voltage on the MIC. This DC voltage is transparent to the passage of computer-transmitted symbols, hence the name "phantom". The impressed voltage is used within the input/output port of the concentrator to effect the transfer of the switching action to cause the serial insertion of the computer in the ring. Cessation of the phantom drive causes a switching action which will bypass the computer and cause the computer to be put into a looped (wrapped) state. This loop may be used by the computer for off-line self-testing functions. The IEEE Standard 802.5 illustrates relay contacts for effecting the switching action to bypass/insert the computer. Typically, a latching relay is used because the impressed phantom voltage, and the resulting phantom current, is not sufficient to continuously power a relay.

Depending upon the particular network, there are two types of concentrators which may be utilized. The first type of concentrator may be referred to as a "passive" concentrator. This type of concentrator is used in a network which is not managed. Thus, there is no provision in this type of network for fault detection or reconfiguration of the network in the event of a fault. Each passive concentrator merely includes a plurality of input/output ports for connection to computers, as well as a ring-in port and a ring-out port for interfacing with a trunk cable connected between adjacent concentrators in the ring. Thus, the passive concentrator is unpowered and derives power for the switching functions from the computers to which it is connected.

The second type of concentrator may be termed an "active" concentrator. One use of an active concentrator is in a managed network. There are at least three aspects of network management. The first aspect is the collection of network statistics. The second aspect is fault tolerance wherein the network can be reconfigured in the event of a cable fault. The third aspect is topology management wherein unused portions may be removed from the ring to keep the ring as short as possible. An active concentrator will thus have some logic circuits and will have a source of power, but its input/output ports still rely on phantom current from a computer for inserting the computer in the ring.

There are circumstances where it would be desirable to use a passive concentrator in a managed network. In this way, the entire passive concentrator can be isolated in the event of a malfunction. It is therefore a primary object of this invention to provide an arrangement whereby a passive concentrator can be connected in a managed token ring network.

SUMMARY OF THE INVENTION

In order to provide limited management of a passive concentrator in a managed token ring network, the passive concentrator should be connected via an input/output port of an active concentrator, rather than being connected between ring-in and ring-out ports of active concentrators. Normally, however, a computer connected to an input/output port of an active concentrator supplies phantom current to control its insertion into the ring, but a passive concentrator cannot do this since it is unpowered. Therefore, according to this invention, the active concentrator is provided with a special input/output port which generates a phantom current for transmission to the passive concentrator connected to that special port. The ring-in port of the passive concentrator is connected to the special input/output port of the active concentrator and the passive concentrator is arranged to return the phantom current to the active concentrator only when at least one of its input/output ports has a computer connected thereto and inserted therein. The special port of the active concentrator senses this returned current to connect the passive concentrator in the ring.

BRIEF DESCRIPTION OF THE DRAWINGS

The foregoing will be more readily apparent upon reading the following description in conjunction with the drawings in which like elements in different figures thereof are identified by the same reference numeral and wherein.

DETAILED DESCRIPTION

Figure 1:
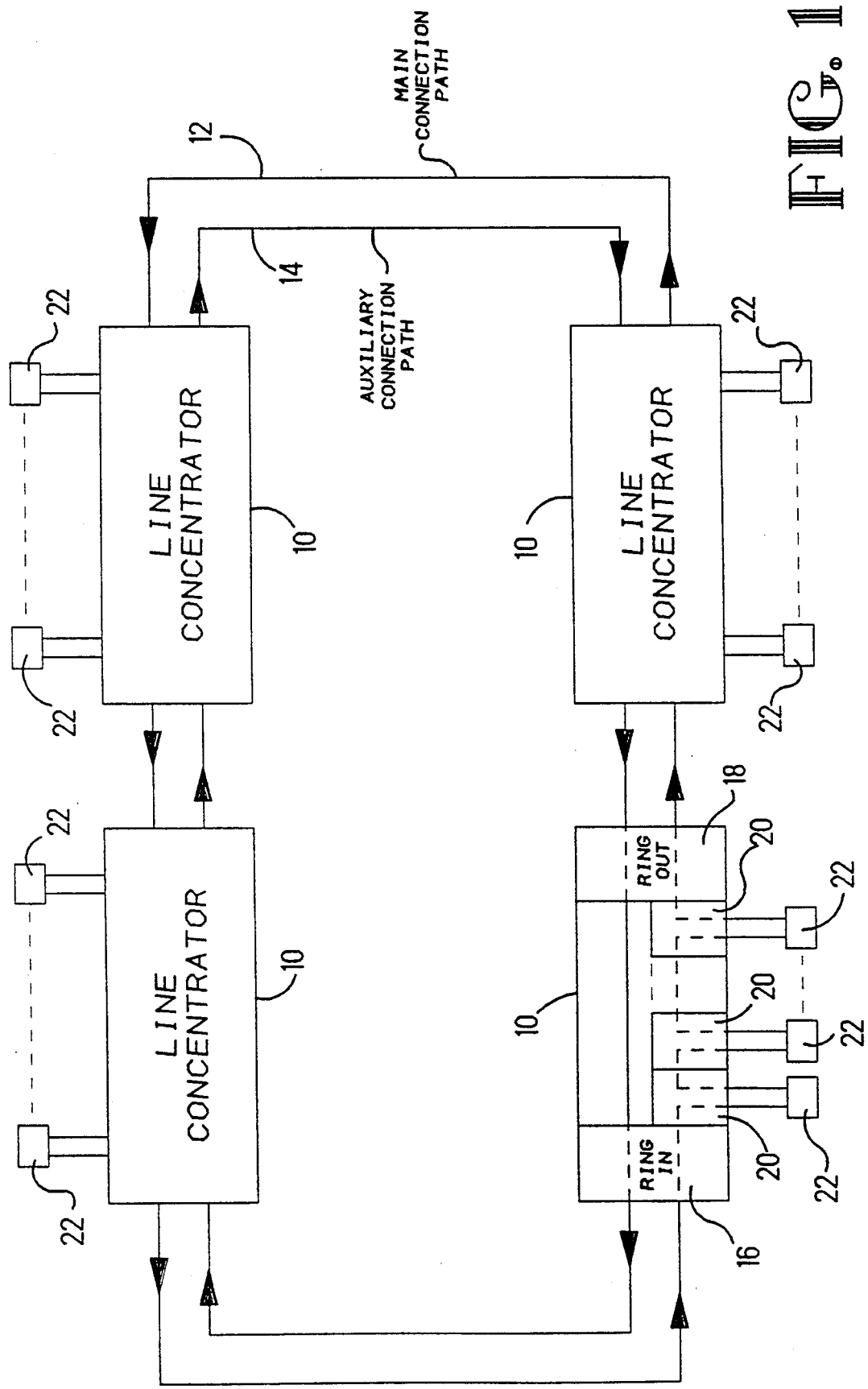
FIG. 1 is a block diagram illustrating a ring communications network in which the principles of this invention may be applied.

Referring now to the drawings, FIG. 1 shows a ring communications network wherein a plurality of line concentrators 10 are connected together in a ring by a trunk cable including a main connection path 12 and an auxiliary connection path 14. Each of the concentrators 10 has a plurality of ports including a ring-in port 16, a ring-out port 18, and a plurality of input/output station ports 20. A plurality of data stations, or computers, 22 are each connected to a respective input/output station port 20 and may be selectively inserted into the communications network in accordance with the protocol established for the particular type of network such as, for example, the IEEE Standard 802.5-1989 for token ring networks. As shown in FIG. 1, the main connection path 12 enters a concentrator 10 through its ring-in port 16 and extends through all of its station ports 20 before exiting the concentrator 10 through its ring-out port 18. Somewhat differently, the auxiliary connection path 14 enters a concentrator 10 through its ring-out port 18 and extends directly to its ring-in port 16, from which it exits the concentrator 10. Each of the connection paths 12, 14 comprises a pair of wires.

The present invention is concerned with a ring communications network of the type shown in FIG. 1 which is of the managed type. Thus, the line concentrators 10 will be of the active type. According to this invention, when it is desired to utilize a passive type of concentrator in such a managed network, the passive concentrator will be connected to one of the input/output station ports of one of the active line concentrators 10. Specifically, as will become clear from the following discussion, an active concentrator to which a passive concentrator is to be connected will have a special concentrator port substituted for one of its input/output station ports 20 and the passive concentrator will be connected thereto via its ring-in port.

Figure 2:
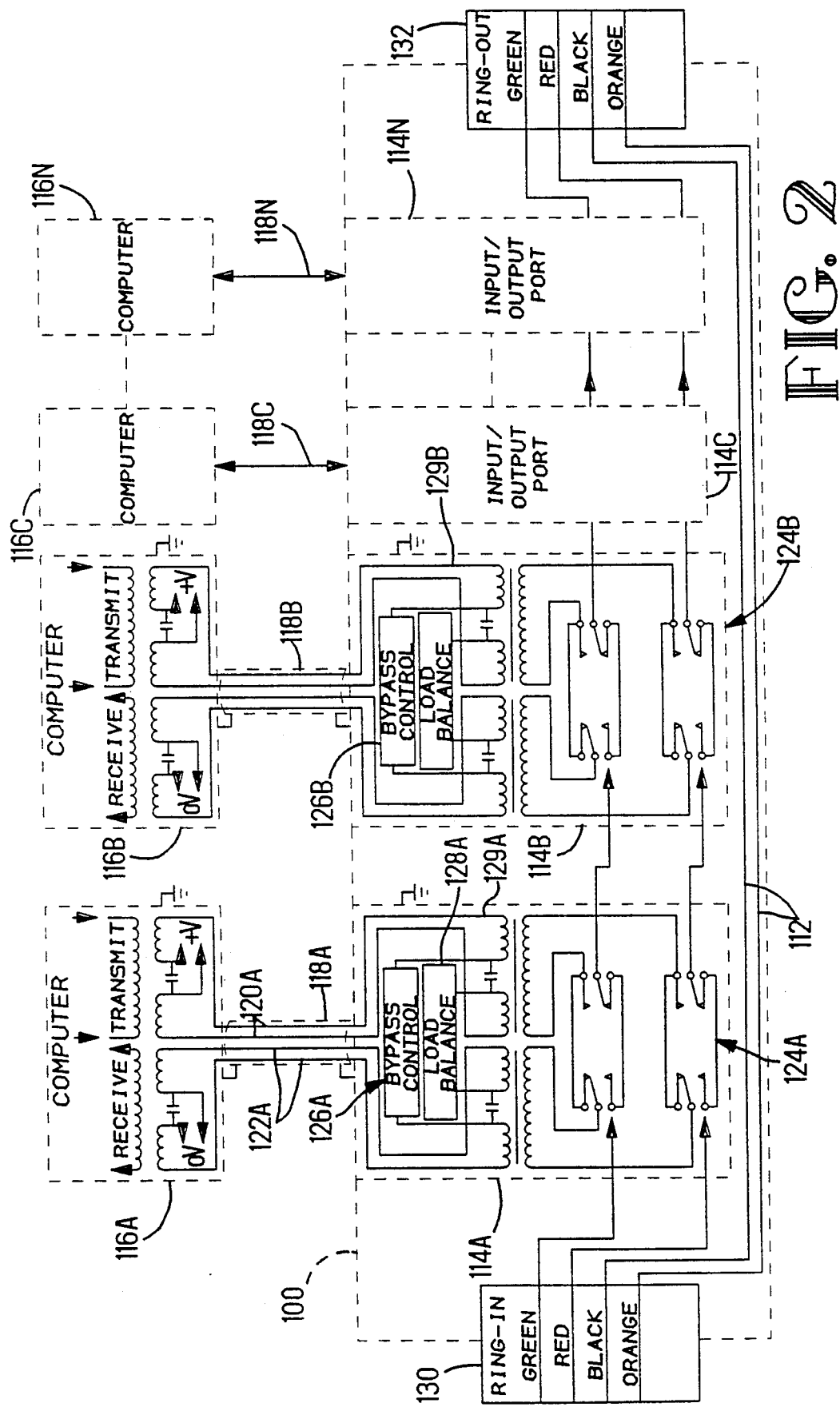
FIG. 2 is a block diagram of a passive concentrator.

FIG. 2 illustrates a passive concentrator 100 constructed according to IEEE Standard 802.5-1989. The concentrator 100 includes a looped, or endless, two wire communications channel, or ring, 112 (also referred to as a trunk) which passes through a plurality of trunk coupling units, or input/output station ports, 114A, 114B, . . . , 114N. These ports are each connected to a respective input/output port of a computer 116A, 116B, . . . , 116N by a medium interface cable 118A, 118B, . . . , 118N. In accordance with the IEEE Standard 802.5-1989, each of the computers 116A, 116B, . . . , 166N includes a token ring adaptor which has separate receive and transmit isolation transformers. Each isolation transformer has two coils which are DC isolated but AC signal coupled to each other so that there is a transmit pair of conductors 120 and a receive pair of conductors 122. These conductors have impressed on them a phantom voltage so that the transmit pair of conductors 120 have a voltage of +V volts DC and the receive pair of conductors 122 have a voltage of 0 volts DC. Within each of the ports 114 of the concentrator 100 the switching mechanism 124 comprises a plurality of relay contacts which are utilized to selectively insert the respective computer 116 into the token ring network or bypass (isolate) the respective computer from the token ring network. Control of the switching action is effected through the bypass control circuit 126 within each of the ports 114. The bypass control circuit 126 includes a latching relay whose contacts make up the switching mechanism 124, and responds to the presence or absence of the phantom voltage impressed on the medium interface cable 118 by the respective computer 116 for inserting or bypassing, respectively, the respective computer 116.

In accordance with the IEEE Standard 802.5-1989, each of the ports 114 also includes a load balance circuit 128. The concentrator 100 also includes a ring-in port 130 and a ring-out port 132. The ring-in and ring-out ports 130, 132 each includes four wires, which conventionally are color coded. Thus, the green and red wires of the ring-in port 130 are connected through the switching mechanisms 124A, 124B, . . . , 124N to the green and red wires, respectively, of the ring-out port 132. The black and orange wires of the ring-in port 130 are connected directly to the black and orange wires, respectively, of the ring-out port 132. If inserted into a ring communications network of the type shown in FIG. 1, the green and red wires will be part of the main connection path 12 and the black and orange wires will be part of the auxiliary connection path 14.

Within each of the ports 114, and connected to the bypass control circuit 126 and the load balance circuit 128, is a multi-coil port isolation transformer 129. The port isolation transformer 129 is made up of a number of separate coils and isolates the DC phantom voltage from the AC data signals. The aforedescribed apparatus is well known in the art and will not be discussed in further detail hereinafter.

Figure 4:
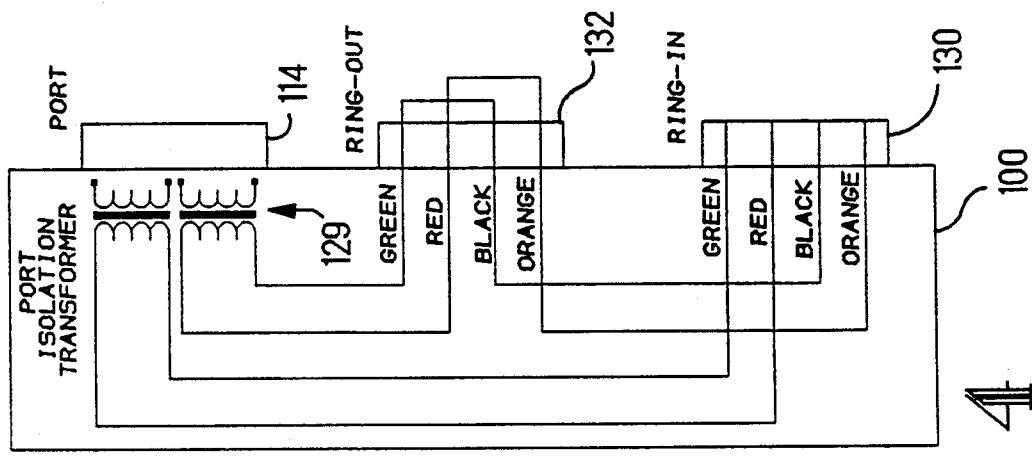
FIG. 4 is a simplified schematic diagram of a passive concentrator showing a computer connected to an input/output port.
Figure 3:
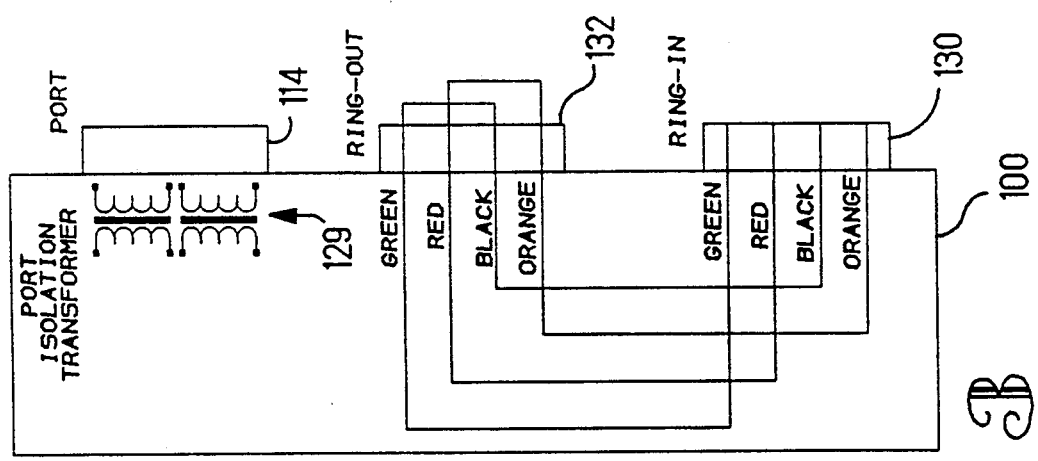
FIG. 3 is a simplified schematic diagram of a passive concentrator without any computers connected to its input/output ports.

According to this invention, when the passive concentrator 100 is to be connected via its ring-in port 130 to a special concentrator port of an active concentrator 10, (FIG. 1) the ring-out port 132 is shunted, as shown in FIGS. 3 and 4, with its green wire connected to its black wire and its red wire connected to its orange wire. Thus, when the passive concentrator 100 does not have any computers inserted in any of its station ports, as shown in FIG. 3, the green wire of the ring-in port 130 is looped back via the green and black wires of the ring-out port 132 to the black wire of the ring-in port 130. Similarly, the red wire of the ring-in port 130 is looped back via the red and orange wires of the ring-out port 132 to the orange wire of the ring-in port 130. However, as shown in FIG. 4, when a computer is inserted at the station port 114 of the passive concentrator 100, the green wire of the ring-in port 130 is connected to the red wire of the ring-in port 130 via a coil of the isolation transformer 129. Similarly, the black wire of the ring-in port 130 is connected to the orange wire of the ring-in port 130 via the black and green wires of the ring-out port 132, another coil of the transformer 129, and the red and orange wires of the ring-out port 132.

Figure 5:
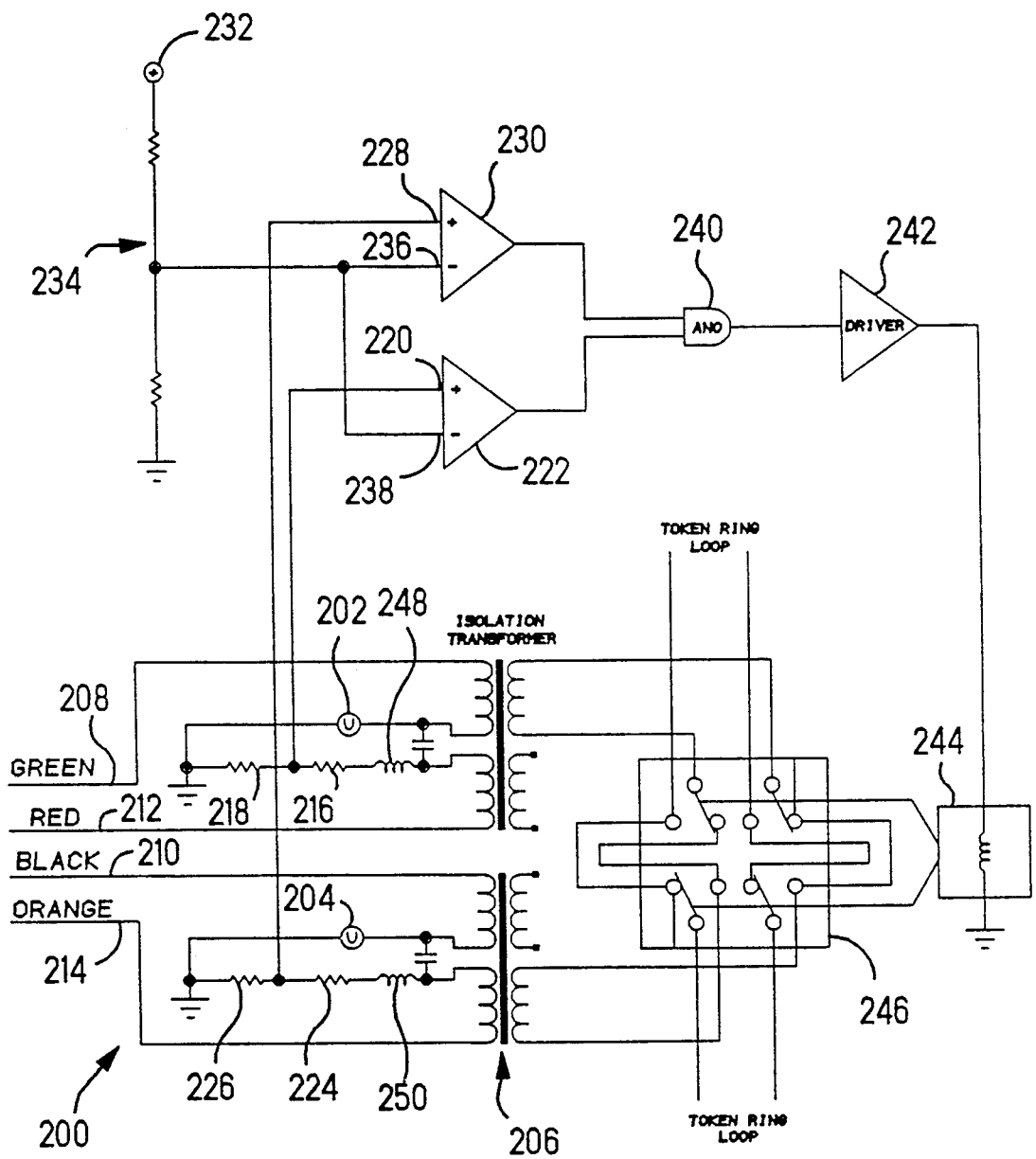
FIG. 5 is a circuit diagram showing the special input/output port of an active concentrator constructed according to this invention.

FIG. 5 illustrates a special concentrator port 200 for an active concentrator which is adapted to have connected thereto a ring-in port of a passive concentrator. The wires of the port 200 are conventionally color coded to match the wires of the ring-in port 130. (According to convention, the wires of all ports are color coded the same.) A typical port of an active concentrator, when connected to a computer, receives phantom current from the computer to determine whether the switching mechanism for inserting that port into the ring is to be activated, as described above with respect to FIG. 2. However, when the ring-in port of a passive concentrator is connected to a station port of an active concentrator, as described above the passive concentrator cannot provide such phantom current. Therefore, according to this invention, the special concentrator port 200 of the active concentrator, shown in FIG. 5, is arranged to provide phantom current to the ring-in port 130 (FIG. 2) of the passive concentrator and to determine whether the passive concentrator is connected thereto with at least one active input/output station port.

According to this invention, there is provided a first source of direct current 202 and a second source of direct current 204. The first source of direct current 202 is arranged to provide current through a coil of the multi-coil isolation transformer 206 to the green wire 208 and the second source of direct current 204 is arranged to provide current through another coil of the isolation transformer 206 to the black wire 210. In the event that no passive concentrator is connected to the special concentrator port 200, there is no return path for the currents on the wires 208 and 210. If a passive concentrator configured as in FIG. 3, with no active ports, is connected to the special concentrator port 200, the current on the green wire 208 is returned through the passive concentrator to the black wire 210, where it bucks up against the current provided from the source 204.

In the event a passive concentrator configured as shown in FIG. 4, having at least one active port, is connected to the special concentrator port 200, the current on the green wire 208 is returned through the passive concentrator to the red wire 212 and the current on the black wire 210 is returned through the passive concentrator to the orange wire 214. The return current on the wire 212 passes through a further coil of the isolation transformer 206 and through the resistors 216 and 218 to ground. The resistors 216 and 218 act to convert the current to a voltage at their junction. The junction of the resistors 216 and 218 is connected to the non-inverting input 220 of the comparator 222. Similarly, the returning current on the lead 214 passes through a still further coil of the isolation transformer 206 and through the resistors 224 and 226 to ground. The junction of the resistors 224 and 226 is connected to the non-inverting input 228 of the comparator 230. A reference voltage derived from the voltage source 232 via the voltage divider 234 is applied to the inverting input 236 of the comparator 230 and to the inverting input 238 of the comparator 222. With voltages present at the non-inverting inputs 220 and 228 of the comparators 228 and 230, respectively, due to the return of current when a connected passive concentrator has the configuration shown in FIG. 4, the outputs of the comparators 222 and 230 are both high. These outputs are applied to the AND gate 240, which controls the driver 242 to energize the relay coil 244. Energization of the relay coil 244 controls the bank of contacts 246 to insert the special concentrator port 200 into the loop within the concentrator 10 (FIG. 1).

In the event there is no passive concentrator connected to the special concentrator port 200, or if a connected passive concentrator does not have an active port, the comparators 222 and 230 will not activate the AND gate 240 and the special concentrator port 200 will be bypassed from the loop. Also, in the event only one of the currents is returned, one of the comparators 222, 230 will not have a high output and therefore the AND gate 240 will not be activated to cause energization of the relay coil 244, so again the port 200 will be bypassed from the loop.

The resistors 216, 218 as well as the resistors 224, 226 also serve as current limiters so that there is no adverse effect upon the isolation transformer 206 due to a change in its operating point. The sources 202 and 204 also limit the current so that a shorted cable does not cause any problem. Further, low pass filters 248 and 250 are provided to prevent data appearing on the wires 208, 212, 210 and 214 from reaching the comparators 222 and 230.

Accordingly, there has been disclosed an arrangement whereby a passive line concentrator can be connected in a managed token ring network. While an illustrative embodiment of the present invention has been disclosed herein, it will apparent to those of ordinary skill in the art that various modifications and adaptations to that embodiment are possible and it is only intended that the present invention be limited by the scope of the appended claims.

We claim:
1. In a token ring network, the combination of:
(a) a concentrator (100) of a first type including a ring-in port (130), a ring-out port (132), a plurality of station ports (114) and an internal loop (112) interconnecting all of said ports, each of said station ports having a multi-coil isolation transformer (129) and switching means (124) for selectively connecting a coil of the isolation transformer to the internal loop upon the detection of a station connected to each station port; and
(b) a concentrator (10) of a second type including an internal loop and a concentrator port (200) adapted for connection to the ring-in port of said first type of concentrator, said concentrator port including:
(1) a multi-coil isolation transformer(206);
(2) a relay having a coil (244) and a bank of contacts (246), said bank of contacts when in a first state due to the energization of said coil coupling the isolation transformer to the internal loop and said bank of contacts when in a second state due to said coil not being energized bypassing the isolation transformer from the internal loop;
(3) means (202) for providing direct current through a first coil of the isolation transformer of the concentrator port at a first wire (208) to the ring-in port of a first type of concentrator connected to said concentrator port, said first type of concentrator being arranged to return said direct current at a second wire (212) of said concentrator port through a coil of at least one isolation transformer (129) within said first type of concentrator when at least one station port has connected thereto a respective station;
(4) first receiving means (216, 218) for receiving current from said second wire through a second coil of the isolation transformer of the concentrator port; and
(5) means (222, 240, 242) responsive to the presence of said direct current at said first receiving means for energizing said relay coil.

2. The combination according to claim 1 wherein:
said first type of concentrator includes another coil of the isolation transformer in each of its station ports;
said means for providing direct current further includes means (204) for providing a second direct current through a third coil of the isolation transformer of the concentrator port at a third wire (210) to the ring-in port of said first type of concentrator connected to said concentrator port, said first type of concentrator being arranged to return said second direct current at a fourth wire (214) of said concentrator port through said another coil of the isolation transformer within said first type of concentrator when at least one station port has connected thereto a respective station;
second receiving means (224, 226) for receiving current from said fourth wire through a fourth coil of the isolation transformer of the concentrator port; and
said energizing means energizes said relay coil only in response to the presence of direct current at both said first and second receiving means.

3. The combination according to claim 2 further including first low pass filter means (248) connected between said second coil and said first receiving means (216, 218) and second low pass filter means (250) connected between said fourth coil and said second receiving means (224, 226).

4. The combination according to claim 2 wherein said first (216, 218) and second (224, 226) receiving means further function to limit the direct currents.

5. The combination according to claim 2 wherein said first receiving means includes first converting means (216, 218) for converting the received direct current at said second wire to a first voltage and said second receiving means includes second converting means (224, 226) for converting the received direct current at said fourth wire to a second voltage, said energizing means including:

means (232, 234) for supplying a reference voltage;

means (222) for comparing said first voltage to said reference voltage and providing a first signal when said first voltage exceeds said reference voltage;

means (230) for comparing said second voltage to said reference voltage and providing a second signal when said second voltage exceeds said reference voltage; and means (240, 242) responsive to the presence of both said first and second signals for energizing said relay coil.

6. The combination according to claim 5 wherein each of said first and second converting means includes a respective resistor which also functions to limit the respective direct current so that it does not have an adverse effect on the isolation transformer in the concentrator port.

* * * * *